V. V. TORBENSEN.
REAR AXLE.
APPLICATION FILED FEB. 5, 1916.
1,380,025.
Patented May 31, 1921.
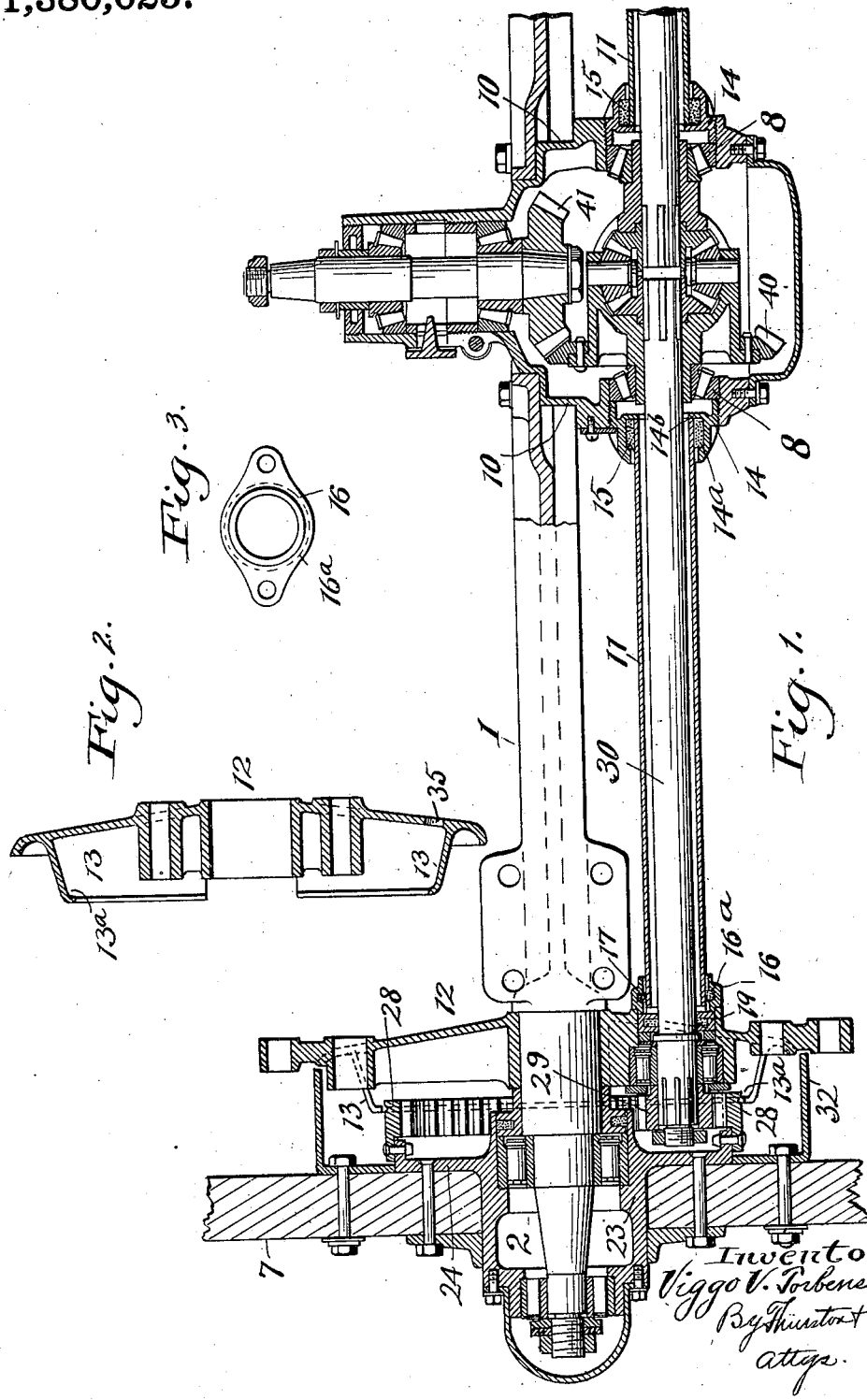

UNITED STATES PATENT OFFICE.

VIGGO V. TORBENSEN, OF CLEVELAND, OHIO, ASSIGNOR TO THE TORBENSEN AXLE COMPANY, OF CLEVELAND, OHIO, A CORPORATION OF OHIO.

REAR AXLE.

1,380,025.  Specification of Letters Patent.  Patented May 31, 1921.

Application filed February 5, 1916. Serial No. 76,241.

*To all whom it may concern:*

Be it known that I, VIGGO V. TORBENSEN, a citizen of the United States, residing at Cleveland, in the county of Cuyahoga and State of Ohio, have invented a certain new and useful Improvement in Rear Axles, of which the following is a full, clear, and exact description.

This invention is an improvement upon the kind of rear axles for automobiles which are typified in my prior Patent No. 1,032,517. The primary object of the invention is to endow the axle with such a degree of flexibility as will contribute to the prevention of breakage in practical use, and at the same time reduce the weight of the axle.

Another object is to protect the brake band from contact with the lubricant which is applied to the internal ring gear and the pinion engaging therewith through which the road wheels are driven.

In the drawing, Figure 1 is a longitudinal horizontal section of somewhat more than one half of an axle embodying the invention. Fig. 2 is a sectional view of one of the axle plates,—the section being vertical and at right angles to the section thereof shown in Fig. 1. Fig. 3 is a detached side view of the sleeve 16.

It will, of course, be understood, that the construction of the axle on both sides of the centrally placed differential gearing and its casing is the same.

In the construction shown in the drawing, the axle 1 is an I section, and it has at each end a spindle 2 on which a road wheel 7 is rotatably mounted. The construction of the mechanism at each end of the axle is the same, and therefore a description of the mechanism at that end of the axle which is shown will be sufficient. An internal gear 28 is fixed to a flange 24 formed on each hub 23 of a road wheel near the inner end of said hub. A pinion 29 engages said internal gear. The pinion is fixed to the outer end of a jack shaft 30, which jack shaft passes through and is rotatably mounted by means of anti-friction bearings, in an axle plate 12 that is fixed to the axle just inside of the adjacent wheel.

A differential gear case 10 is bolted rigidly to the axle near its middle. This contains differential gearing of conventional construction, with which the inner end of each jack shaft has the usual operative connection.

Two casing tubes 11 extend from the differential gear case in opposite directions to the axle plates. In prior constructions it has been customary to rigidly connect each of these casing tubes to the differential casing and to an axle plate. In use these axles are subjected to enormous strains which slightly twist and bend and otherwise distort the structure. Sometimes this twisting and bending breaks these casing tubes. Manufacturers have attempted to prevent such breakage by making said tubes so strong, and consequently so heavy, that they are not easily broken. Obviously this added weight is objectionable.

In the present construction, however, these casing tubes are preferably made of thin drawn steel tubing; and their ends are flexibly connected with the casing 10 and with the axle plates. The drawing shows a practically satisfactory manner of so connecting these axle tubes.

An annular sleeve 14 is screwed into a hole in each end of the casing 10; and each sleeve serves the double purpose of receiving the end of the casing tube 11, and fixing in position the outer ring 8 of the anti-friction bearings which support the differential mechanism. The other end of each casing tube projects into a sleeve 16 which is bolted to the inner face of the associated axle plate 12.

In the sleeve 14 is an internal annular groove 14ᵃ which contains a packing ring 15, the internal diameter of which is slightly less than the internal diameter of the sleeve. This packing ring may be made of tightly compacted felt, although other material may of course be used. The end of the casing tube which goes into this sleeve is a very loose fit in the sleeve, in fact, it preferably does not touch it at all, but it has a very tight fit in this packing ring. Similarly, the sleeve 16 is formed with an internal groove 16ᵃ in which a similar packing ring 17 is packed. The casing tube fits tightly in this packing ring, but very loosely in the sleeve 16.

It will be seen also that the casing tube 11 may move endwise slightly with respect to one or the other of the sleeves for supporting said ends. As shown it may so move within the sleeve 16 and the packing ring carried thereby. There is, however, supported by the axle plate surrounding the jack shaft a ring 19, which extends part way across the adjacent end of the casing tube; and therefore it will limit the relative endwise movement of the casing tube with respect to the sleeve 16. The sleeve 14 is formed with an inwardly projecting flange 14ᵇ which is extended part way across the adjacent end of the casing tube 11; and therefore it limits the endwise movement of said casing tube within the sleeve 14.

From the foregoing it is apparent that if, in use, the axle is twisted or bent so as to disaline the supporting sleeves 14 and 16, comparatively little strain will be applied to the casing tubes, because of the flexibility of the packing rings within which the ends of said casing tubes project as stated. The possible endwise movement of the casing tube with respect to the supporting sleeves 16 and 14, which latter as stated serves the additional purpose of fixing the position of the anti-friction bearing ring 8 for the differential gearing, makes it certain that no such pressure will be applied to one side of said bearing ring as might throw it out of true and produce undue friction in the bearings.

A brake drum 32 is fixed to each wheel and this lies well outside of the internal gear 29. Fixed to or formed as a part of each axle plate 12 is a flange 13 which extends outward past and outside of the inner edge of the internal ring gear. And this flange has its free edge inclined toward the axis of this gear so as to make a shallow annular oil pocket 13ᵃ around it. It is obvious that any oil or grease which flows over the inner edge of the ring gear will drop or be thrown by centrifugal force into this cupshaped oil pocket. Leading from this oil pocket outwardly is an oil duct 35 which is placed near the lowest part of said pocket, and through this duct oil in this oil pocket may run and be discharged entirely inside of the brake drum.

Having described my invention, I claim:

1. In apparatus of the character described wherein there is provided a dead-axle, tread wheels carried at its ends, a gear casing secured to the dead-axle intermediate the ends of the axle, differential gearing within said casing, jack shafts connected by said differential gearing within said casing, and extending from the casing to the wheels, gearing connecting the shafts and wheels, and tubular members extending from the gear casing and inclosing the shafts, the combination with at least one of said tubular members, of means yieldingly connecting said member with the gear casing to permit relative angular movement between said casing and tubular member.

2. In apparatus of the character described wherein there is provided a dead-axle, tread wheels carried at its ends, a gear casing secured to the dead-axle intermediate the ends of the axle, differential gearing within said casing, jack shafts connected by said differential gearing within said casing, and extending from the casing to the wheels, gearing connecting the shafts and wheels, and tubular members extending from the gear casing and inclosing the shafts, the combination with each of said tubular members of means yieldingly connecting said tubular members to the gear casing to permit relative rotative and linear angular movement between said gear casing and each of the tubular members.

3. In apparatus of the character described wherein there is provided a dead-axle, tread wheels carried at its ends, a gear casing secured to the dead-axle intermediate the ends of the axle, differential gearing within said casing, jack shafts connected by said differential gearing within said casing, and extending from the casing to the wheels, gearing connecting the shafts and wheels, tubular members extending from the gear casing and inclosing the shafts, and means for supporting the outer ends of the tubular members from the dead-axle, the combination with at least one of said tubular members and its end support, of means for yieldingly connecting said tubular member to its end support to permit relative angular movement between the tubular member and its end support.

4. In a driving axle, the combination of an axle member having at its ends spindles for the mounting of the road wheels, axle plates secured to the axle member near its ends, a differential gear casing rigidly fixed to said axle near its middle, and two casing tubes which at their inner ends are flexibly connected with the differential gear casing and at their outer ends are similarly connected with the axle plates.

5. In a driving axle, the combination of an axle member having at its ends spindles for the mounting of the road wheels, axle plates secured to the axle near its ends, a differential gear casing rigidly fixed to said axle near its middle, two alined sleeves at the ends of the gear casing, two other sleeves carried by the axle plates in alinement with the first mentioned sleeves, two casing tubes each of which is fitted loosely into one sleeve carried by the casing and one sleeve carried by the axle plates, and internal packing rings carried by each of said sleeves and tightly embracing the part of the casing tube therein, each of said casing tubes being capable of endwise movement relative to one or the other of the two sleeves which embrace the ends of said casing tube.

6. In a driving axle, the combination of an axle member having at its ends spindles for the mounting of the road wheels, a differential gear casing which is rigidly fixed to the axle member near its middle, and has in its ends circular holes, ring bearings mounted in said holes, sleeves which screw into said holes and engage and locate said ring bearings, axle plates secured to the axle member near its ends having holes which are alined with the holes in the gear casing, sleeves bolted to the inner faces of said axle plates over said holes therein, casing tubes each of which is loosely fitted at one end in a sleeve carried by the casing and at its other end in a sleeve carried by an axle plate, and internal packing rings carried by all of said sleeves which tightly embrace the axle tubes therein.

7. In a driving axle, the combination of an axle member having at its ends spindles for the mounting of the road wheels, axle plates secured to the axle near its ends, a differential gear casing rigidly fixed to said axle near its middle, two alined sleeves at the ends of the gear casing, two other sleeves carried by the axle plates in alinement with the first mentioned sleeves, two casing tubes each of which is fitted loosely into one sleeve carried by the casing and one sleeve carried by the axle plates, and internal packing rings carried by said sleeves and each tightly embracing the part of the casing tube therein, and shoulders carried by the gear casing and axle plates which project inward across the ends of said casing tubes but normally out of contact with one end or the other thereof, to limit the endwise movements of said tubes.

8. In a driving axle, the combination of an axle member having spindles at its ends, wheels rotatably mounted on said spindles, a ring gear rigid with and on the inner side of each wheel, a differential gear case fixed to the axle member near its middle, an axle plate fixed to the axle member inside of and adjacent each wheel, each of said axle plates being provided with a flange on its outer face which projects past but close to the adjacent edge of the ring gear and at an angle toward the axis of said ring gear, thereby forming an oil pocket,— each axle plate having a drain hole through it which communicates with the lower part of said oil pocket, jack shafts which project through and are rotatably mounted in said axle plates, a pinion fixed to the end of each jack shaft in mesh with the adjacent ring gear, and differential mechanism which is mounted in said differential gear case and is operatively connected with said jack shafts.

9. In a driving axle, the combination of an axle member having at its ends spindles for the mounting of the road wheels, axle plates secured to the axle member near its ends, a differential gear case rigidly fixed to said axle member near its middle, and casing tubes for the live axles which are connected at their ends to said axle plates and differential gear casing, the said connections being flexible at at least one end of each tube, for the purpose of having the tube relieved of undue strain.

10. In a driving axle, the combination of an axle member having at its ends spindles for the mounting of the road wheels, axle plates secured to said axle near its ends, a differential gear casing rigidly fixed to said axle near its middle, two alined sleeves carried by the ends of the differential gear casing, two other sleeves carried by the axle plates in alinement with the first mentioned sleeves, two casing tubes each of which is fitted into one sleeve carried by the casing and one sleeve carried by the axle plate and each tube being fitted loosely at one of its ends into the adjacent sleeve and an internal packing ring for each tube which tightly embraces said tube and tightly fits within that sleeve in which the tube is loosely fitted.

11. In a driving axle, the combination of an axle member having spindles at its ends, wheels rotatably mounted on said spindles, a ring gear rigid with and on the inner side of said wheel, a differential gear case fixed to the axle member near its middle, axle plates fixed to the axle member inside of and adjacent the respective wheels, each of said axle plates being provided with a flange on its outer face which projects past but close to the adjacent edge of the ring gear thereby forming an oil pocket,—each axle plate having a drain hole through it which communicates with the lower part of said oil pocket, jack shafts which project through and are rotatably mounted in said axle plates, a pinion fixed to each end of the jack shaft in mesh with the adjacent ring gear, and differential mechanism which is mounted in said differential gear case and is operatively connected with said jack shafts.

12. In a device of the character described, the combination of an axle member having spindles at its ends, wheels rotatably mounted on said spindles, a brake drum and a ring gear secured to the inner side of each wheel substantially concentric with the axle, said ring gear being of less diameter than the brake drum, an axle plate fixed to the axle member inside of and adjacent each of said wheels, means for rotating each ring gear and wheel including jack shafts, one projecting through each plate, and each having a pinion meshing with the adjacent ring gear, each plate being provided with an annular flange of greater diameter than the ring gear and projecting toward the wheel in position to catch oil from the ring gear and protect the drum from oil and shaped to form an oil pocket, said oil pocket having a discharge opening for oil that may be caught in the pocket, said opening discharging outside of the drum.

13. In a transmission mechanism for vehicles, the combination of an axle, wheels on said axle, a divided counter shaft provided with a differential and having means engaging said wheels for driving the same, and a casing for said counter shaft wholly supported by said axle, said casing being flexible so as to provide for elastic displacement of said axle.

14. In a vehicle, a counter shaft, means for driving said shaft, a casing for said shaft, one part of said casing being supported near one side of the automobile and toward the center thereof, the means for driving said counter shaft having a bearing in said part of the casing, the other part of the casing being flexibly connected to the first named part at its inner end, and extending to the other side of the automobile.

15. In a vehicle, a counter shaft, means for driving said shaft, a casing for said shaft, one part of said casing being supported near one side of the vehicle and toward the center thereof, the means for driving said counter shaft having a bearing in said part of the casing, the other part of the casing being flexibly connected to the first named part at its inner end and flexibly supported at its outer end.

16. In a transmission mechanism for vehicles, a counter shaft consisting of two parts, a differential gearing adapted to actuate said parts at their adjacent ends, a casing for said differential mechanism, a casing for one part of said shaft secured to said differential gear casing at one end and secured at the other end, means for securing said casings in place, and a casing for the other part of said counter shaft flexibly connected to said differential casing.

17. In a transmission mechanism for vehicles, a counter shaft consisting of two parts, a differential gearing adapted to actuate said parts at their adjacent ends, a casing for said differential mechanism, a casing for one part of said shaft secured to said differential gear casing at one end and secured at the other end, means for securing said casings in place, and a casing for the other part of said counter shaft flexibly connected to said differential casing, and flexibly supported at its end remote from said differential gear casing.

18. In a transmission mechanism for vehicles, a divided shaft, a differential gearing located at the adjacent ends of the parts of said shaft and adapted to actuate said parts, a differential gear casing, means for supporting said differential gear casing wholly upon the axle, means bearing in said differential gear casing for actuating the divided shaft through the differential gearing and a flexible casing for a part of said shaft.

19. In a transmission gearing for vehicles, the combination of an axle, a counter shaft, a casing for said counter shaft, said casing being connected to said axle at three points and being provided with a flexible articulation to allow said casing to deflect with said axle.

In testimony whereof, I hereunto affix my signature in the presence of two witnesses.

VIGGO V. TORBENSEN.

Witnesses:
E. L. THURSTON,
E. B. GILCHRIST.